United States Patent [19]

Kamezawa et al.

[11] Patent Number: 5,311,002
[45] Date of Patent: May 10, 1994

[54] CIRCUIT FOR DEALING WITH A BAR CODE SIGNAL AND A HIGH SPEED ELECTRIC SIGNAL

[75] Inventors: Hiroshi Kamezawa; Hiroshi Hayashi, both of Tokyo; Nobuyuki Sone, Shizuoka, all of Japan

[73] Assignee: NEC Corporation, Japan

[21] Appl. No.: 977,922

[22] Filed: Nov. 18, 1992

[30] Foreign Application Priority Data

Nov. 19, 1991 [JP] Japan .................................. 3-303315
Dec. 20, 1991 [JP] Japan .................................. 3-355294

[51] Int. Cl.5 .............................................. G06K 7/10
[52] U.S. Cl. .................................... 235/472; 235/462; 359/189
[58] Field of Search .................. 235/462, 454, 472; 359/143, 170, 189

[56] References Cited

U.S. PATENT DOCUMENTS

| | | | |
|---|---|---|---|
| 4,402,088 | 8/1983 | McWaters | 382/68 |
| 4,542,528 | 9/1985 | Sanner | 382/62 |
| 4,682,015 | 7/1987 | Quan | 235/472 |
| 4,736,096 | 4/1988 | Ushikubo | 235/472 |
| 5,023,951 | 6/1991 | Kahn | 455/619 |

Primary Examiner—Davis L. Willis
Assistant Examiner—Karl D. Frech
Attorney, Agent, or Firm—Laff, Whitesel, Conte, Saret

[57] ABSTRACT

In a circuit for producing an output signal under selective control of a control signal produced by a processor used in combination, a bar code reader and an optical communication receiver comprise in common a first low pass filter having a first cutoff frequency to produce a first low pass filtered signal. The optical communication receiver comprises a first digitizer connected to the first low pass filter for digitizing the first low pass filtered signal to supply a first digital signal to a serial communication unit. The bar code reader comprises a second low pass filter having a second cutoff frequency and connected to the first low pass filter for filtering the first low pass filtered signal to produce a second low pass filtered signal. A second digitizer is connected to the second low pass filter for digitizing the second low pass filtered signal to supply a second digital signal to an interrupt control unit. Alternatively, the second low pass filter may be connected to an input terminal of the first low pass filter instead of an output terminal of the first low pass filter.

6 Claims, 3 Drawing Sheets

CIRCUIT FOR DEALING WITH A BAR CODE SIGNAL AND A HIGH SPEED ELECTRIC SIGNAL

BACKGROUND OF THE INVENTION

This invention relates to a circuit for use in combination with a processor for producing a control signal. The circuit comprises a bar code reader, such as a WAND type bar code reader, for reading a bar code responsive to code illuminating light for producing reflected light and an optical communication receiver for receiving an optical signal. The circuit is selectively controlled by the control signal to produce an output signal.

In a conventional circuit which will later be described a little more in detail, the bar code reader and the optical communication receiver includes in common an optical sensor for converting a combination of the reflected light and the optical signal to an electric signal. When supplied with the reflected light, the optical sensor produces a bar code signal. When supplied with the optical communication signal, the optical sensor produces an electric communication signal. The bar code signal and the electric communication signal are herein referred to collectively as an electric signal.

A low pass filter filters the electric signal to remove a high frequency noise and to produce a low pass filtered signal. A digitizer is connected to the low pass filter for digitizing the low pass filtered signal to produce a digital signal. A serial communication unit is connected to the digitizer for producing the output signal. An interrupt control unit is connected to the digitizer for producing also the output signal. One of the serial communication unit and the interrupt control unit is selectively controlled by the control signal to produce the output signal.

As will later be described more in detail, the conventional circuit is defective in that the optical signal must have a transmission speed which is limited by a cutoff frequency of the low pass filter.

SUMMARY OF THE INVENTION

It is therefore an object of the present invention to provide a circuit for dealing with a bar code signal and a high-speed electric communication signal.

It is another object of the present invention to provide a circuit comprising a bar code reader and an optical communication receiver capable of receiving a high speed optical signal.

Other objects of this invention will become clear as the description proceeds.

On describing the gist of an aspect of this invention, it is possible to understand that a circuit is for use in combination with a processor for producing a control signal and comprises a bar code reader for reading a bar code responsive to code illuminating light for producing reflected light and an optical communication receiver for receiving an optical signal, and is selectively controlled by the control signal to produce an output signal, wherein the bar code reader and the optical communication receiver include common photoelectric means for converting a combination of the reflected light and the optical signal to an electric signal.

According to the above-described aspect of this invention, the bar code reader and the optical communication receiver of the above-understood circuit comprise in common a first low pass filter having a first cutoff frequency and connected to the photoelectric means for filtering the electric signal to produce a first low pass filtered signal, the optical communication receiver of the above-understood circuit which comprises a first digitizer connected to the first low pass filter for digitizing the first low pass filtered signal to produce a first digital signal, and a serial communication unit connected to the first digitizer for converting the first digital signal to the output signal to give a predetermined form to the output signal when the control signal is not received. The bar code reader of the above-understood circuit comprises a second low pass filter having a second cutoff frequency and connected to the first low pass filter for filtering the first low pass filtered signal to produce a second low pass filtered signal, a second digitizer connected to the second low pass filter for digitizing the second low pass filtered signal to produce a second digital signal, and an interrupt control unit connected to the second digitizer for producing the output signal when the control signal is not received.

According to a different aspect of this invention, it is possible to understand that a circuit is for use in combination with a processor for producing a control signal and comprises a bar code reader for reading a bar code responsive to code illuminating light for producing reflected light and an optical communication receiver for receiving an optical signal, and is selectively controlled by the control signal to produce an output signal, wherein the bar code reader and the optical communication receiver include common photoelectric means for converting a combination of the reflected light and the optical signal to an electric signal.

According to the different aspect of this invention, the optical communication receiver of the above-understood circuit comprises a first low pass filter having a first cutoff frequency and connected to the photoelectric means for filtering the electric signal to produce a first low pass filtered signal, a first digitizer connected to the first low pass filter for digitizing the first low pass filtered signal to produce a first digital signal, and a serial communication unit connected to the first digitizer for converting the first digital signal to the output signal to give a predetermined form to the output signal when the control signal is not received. The bar code reader of the above-understood circuit comprises a second low pass filter having a second cutoff frequency and connected to the first low pass filter for filtering the first low pass filtered signal to produce a second low pass filtered signal, a second digitizer connected to the second low pass filter for digitizing the second low pass filtered signal to produce a second digital signal, and an interrupt control unit connected to the second digitizer for producing the output signal when the control signal is not received.

DESCRIPTION OF THE PREFERRED EMBODIMENT

Figure 1:
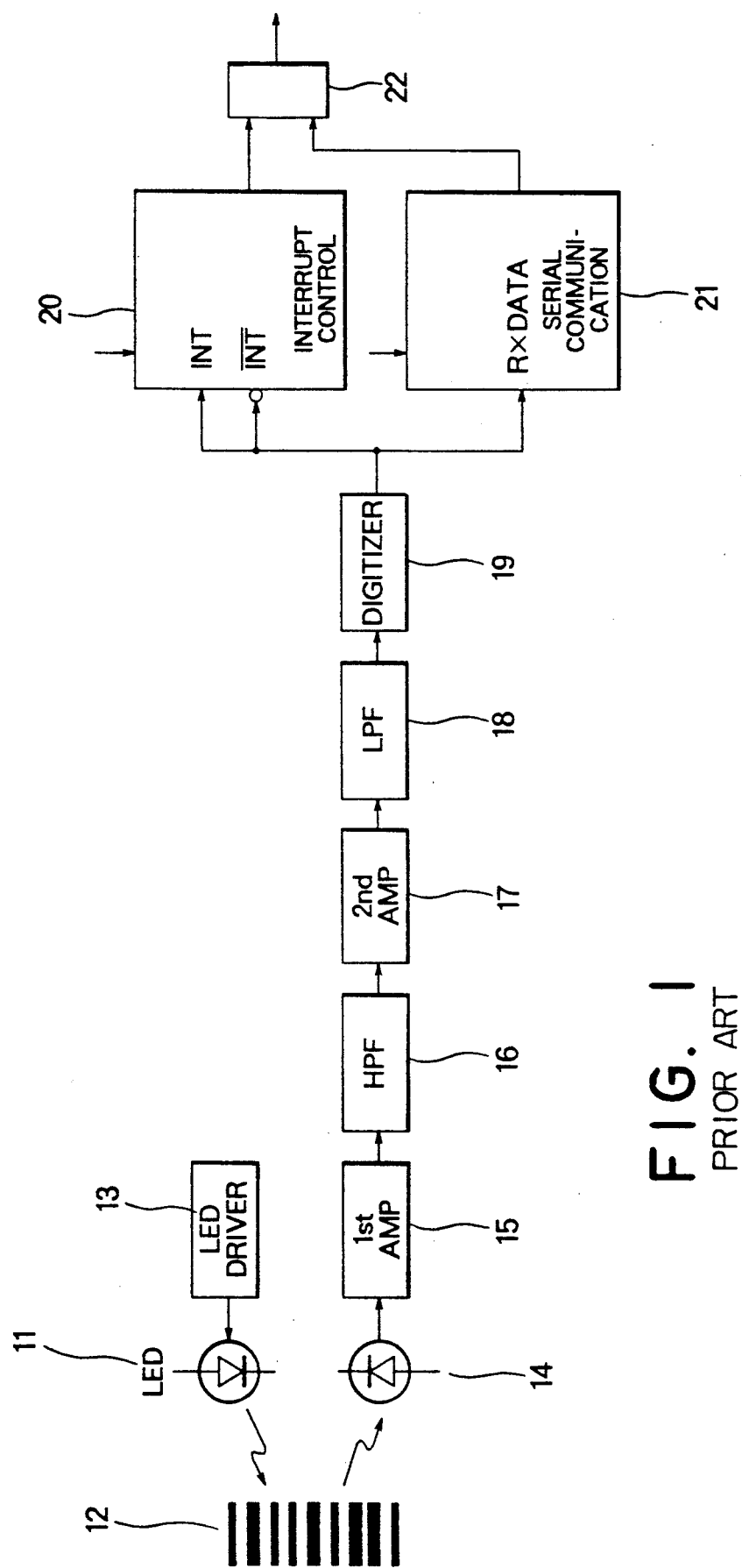
FIG. 1 is a block diagram of a conventional circuit comprising a bar code reader and an optical communication receiver.

Referring to FIG. 1, a conventional circuit will first be described in order to facilitate an understanding of the present invention. The circuit comprises a bar code reader and an optical communication receiver and is selectively operable as the bar code reader and the optical communication receiver. The circuit is for use in combination with a processor for producing a control signal. In the manner which will presently be described more in detail, the bar code reader reads a bar code responsive to code illuminating light for producing reflected light. The optical communication receiver receives an optical signal. The bar code reader and the optical communication receiver are selectively controlled by the control signal to produce an output signal.

In FIG. 1, the bar code reader comprises a LED 11 for illuminating a bar code 12 which produces reflected light. A LED driver 13 is connected to the LED 11 for driving the LED 11. The bar code reader and the optical communication receiver comprise in common an optical sensor 14 for converting a combination of the reflected light and the optical signal to an electric signal. A first amplifier (1st AMP) 15 is connected to the optical sensor 14 for amplifying the electric signal to produce a first amplified signal. A high pass filter (HPF) 16 is connected to the first amplifier 15 for filtering the first amplified signal to produce a high pass filtered signal. A second amplifier (2nd AMP) 17 is connected to the high pass filter 16 for amplifying the high pass filtered signal to produce a second amplified signal. A low pass filter (LPF) 18 is connected to the second amplifier 17 for filtering the second amplified signal to produce a low pass filtered signal. A digitizer 19 is connected to the low pass filter 18 for digitizing the low pass filtered signal to produce a digital signal. An interrupt control unit 20 is connected to the digitizer 19 for producing the output signal when the control signal is not received. A serial communication unit 21 is connected to the digitizer 19 for converting the digital signal to the output signal to give a predetermined form to the output signal when the control signal is not received.

Operation of the circuit will now be described. When the circuit operates as the bar code reader, the LED driver 13 drives the LED 11. The LED 11 emits the code illuminating light to illuminate the bar code 12. The LED 11 and the optical sensor 14 are moved on the bar code 12 by an operator of the bar code reader to scan the bar code 12.

The code illuminating light is reflected by the bar code 12 into the reflected light. In the manner known in the art, the bar code 12 comprises black bars and white bars. The white bar has a higher reflectance than the black bar.

The optical sensor 14 converts not only the reflected light but surrounding light, such as sunlight, light of electric lamps, and light of fluorescent lamps, to the electric signal in response to the reflected light and the surrounding light.

The first amplifier 15 amplifies the electric signal. The high pass filter 16 filters the first amplified signal to remove low frequency components. The low frequency components are caused by the surrounding light. For example, the high pass filter 16 passes signals having frequencies which are higher than 60 Hz.

The second amplifier 17 amplifies the high pass filtered signal. The low pass filter 18 filters the second amplified signal to remove high frequency noise.

A smallest width of black and white bars is about 0.18 mm. A maximum scanning speed of the optical sensor 14 is about 760 mm/sec. It takes a smallest scanning time of (0.18 mm)/(760 mm/sec), namely, 237 microseconds, to make the optical sensor 14 scan by the maximum scanning speed the black or the white bar that has the smallest width. The low pass filter 18 removes the high frequency noise which results from dots and spots on a sheet and has a pulse width narrower than 237 microseconds.

The digitizer 19 digitizes the low pass filtered signal. When the optical sensor 14 receives the reflected light from the black bar, the digitizer 19 produces a logic "1" level, such as +5 V. When the optical sensor 14 receives the reflected light from the white bar, the digitizer 19 produces a logic "0" level, such as 0 V. This means that the digitizer 19 delivers the logic "1" and the logic "0" levels in dependence upon an output signal which is sent from the low pass filter 18 and which is produced in response to the reflected light.

The interrupt control unit 20 has an interruption terminal INT and a negative interruption terminal $\overline{\text{INT}}$. The interrupt control unit 20 detects trailing edges from the digital signal which is supplied to the interruption terminal INT. The interrupt control unit 20 detects leading edges from the digital signal which is supplied to the negative interruption terminal $\overline{\text{INT}}$. The trailing edges correspond to a change from the white bar to the black bar. The leading edges correspond to a change from the black bar to the white bar. The trailing edges and the leading edges appear with edge intervals, which are not shorter than the smallest interval of 237 microseconds. Strictly speaking, the interrupt control unit 20 only informs the processor 22 of occurrence of interruption. The interrupt control unit 20 produces the output signal with a predetermined pattern which depends on the edge intervals. The interrupt control unit 20 produces an interrupt signal together with the output signal and supplies both the interrupt signal and the output signal to the processor 22.

The serial communication unit 21 has a data terminal RxDATA supplied with the digital signal. While the circuit operates as the bar code reader, the processor 22 supplies the control signal to the serial communication unit 21 to mask the digital signal.

When the circuit operates as the optical communication receiver, the LED driver 13 does not drive the LED 11. The LED 11 does not emit the code illuminating light.

An optical communication transmitter (not shown) has a data transmitting LED (not shown). The data transmitting LED emits an optical signal which becomes alternately light as a luminous part and dark as a dark part with a period which may or may not differ from the reflected light. The luminous and dark parts correspond to the white and black bars of the bar code 12. The optical signal is supplied to the optical sensor 14.

The optical sensor 14, the first amplifier 15, the high pass filter 16, the second amplifier 17, and the low pass filter 18, and the digitizer 19 are operable in the manner described in connection with the bar code reader. The digital signal has the logic "1" level, such as +5 V, when the optical sensor 14 senses the dark part. The digital signal has the logic "0" level, such as 0 V, when the optical sensor 14 senses the luminous part. In the manner described above, the digital signal is supplied to the data terminal RxDATA of the serial communication unit 21.

The serial communication unit 21 converts the digital signal to the output signal to give a predetermined form to the output signal with the predetermined form which depends on the luminous and dark parts. For example, the serial communication unit 21 is a serial/parallel converter when the circuit operates as the optical communication receiver. The serial communication unit 21 supplies the output signal to the processor 22.

While the circuit operates as the serial communication receiver, the processor 22 supplies the control signal to the interrupt control unit 20. The control signal makes the interrupt control unit 20 mask both the interrupt terminal INT and the negative interrupt terminal $\overline{\text{INT}}$.

The serial communication receiver can not receive an optical signal having a speed faster than 4222 bit per second, because the low pass filter removes the optical signal as high frequency noise.

Figure 2:
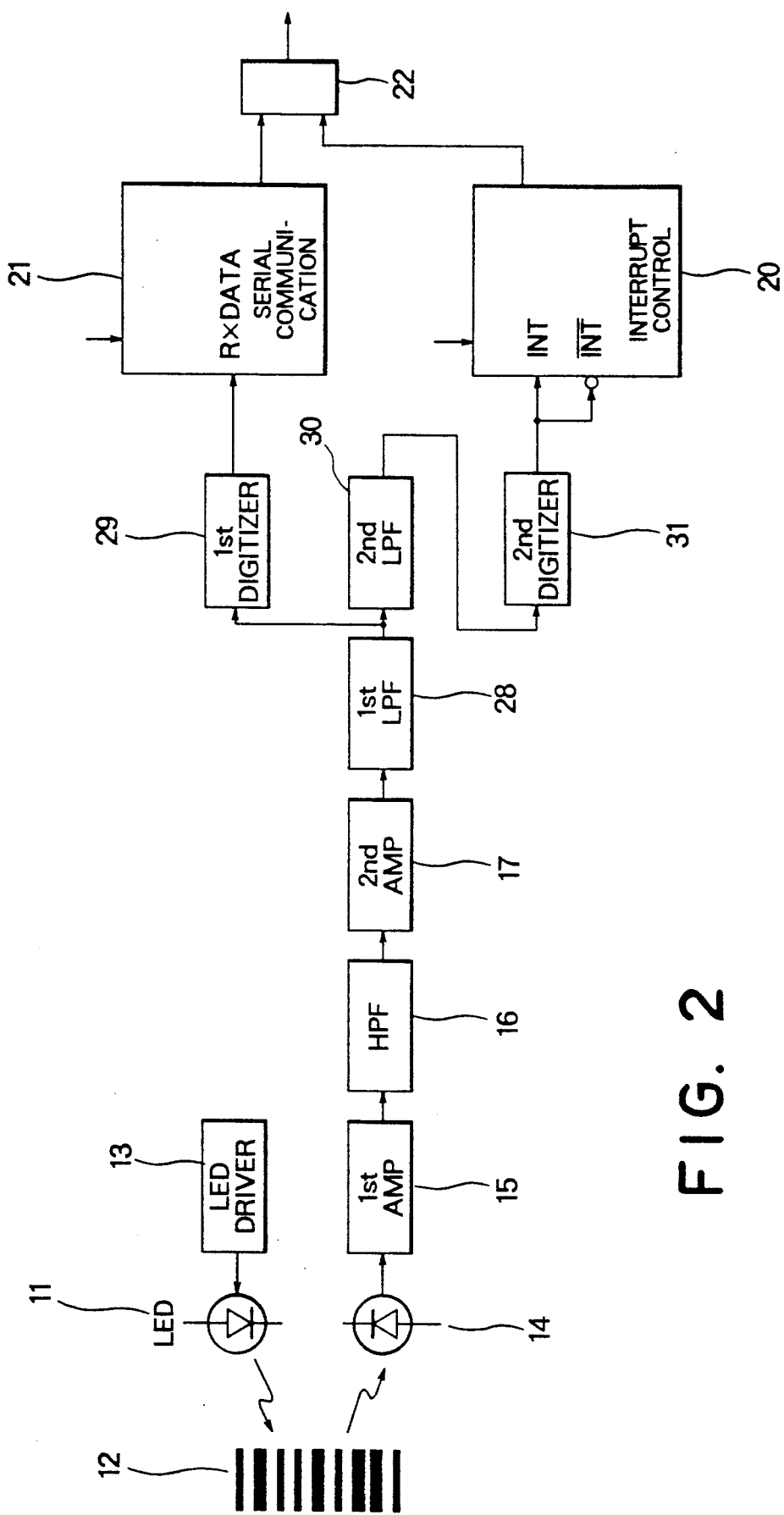
FIG. 2 is a block diagram of a circuit comprising a bar code reader and an optical communication receiver according to an embodiment of this invention.

Referring to FIG. 2, the description will proceed to a circuit according to a preferred embodiment of this invention. Similar parts are designated by like reference numerals.

This circuit is for use in combination with a processor for producing a control signal. The circuit comprises a bar code reader and an optical communication receiver and is selectively operable as the bar code reader and the optical communication receiver. In the manner described with reference to FIG. 1, the bar code reader reads a bar code responsive to code illuminating light for producing reflected light. The optical communication receiver receives an optical signal. The bar code reader and the optical communication receiver are selectively controlled by the control signal to produce an output signal.

In FIG. 2, the bar code reader comprises a LED 11 for illuminating a bar code 12, which produces the reflected light. A LED driver 13 is connected to the LED 11 for driving the LED 11. The bar code reader and the optical communication receiver comprise in common an optical sensor 14 for converting a combination of the reflected light and the optical signal to an electric signal. A first amplifier (1st AMP) 15 is connected to the optical sensor 14 for amplifying the electric signal to produce a first amplified signal. A high pass filter (HPF) 16 is connected to the first amplifier 15 for filtering the first amplified signal to produce a high pass filtered signal. A second amplifier (2nd AMP) 17 is connected to the high pass filter 16 for amplifying the high pass filtered signal to produce a second amplified signal.

It should be noted that a first low pass filter (1st LPF) 28 is connected to the second amplifier 17 and has a first cutoff frequency to filter the second amplified signal into a first low pass filtered signal. The optical communication receiver comprises a digitizer 29 connected to the first low pass filter 28 for digitizing the first low pass filtered signal to produce a first digital signal. A serial communication unit 21 is connected to the first digitizer 29. The serial communication unit 21 converts the first digital signal to the output signal to give a predetermined form to the output signal when the control signal is not received. The predetermined form will presently be described. The bar code reader comprises a second low pass filter (2nd LPF) 30 having a second cutoff frequency and connected to the first low pass filter 28 for filtering the first low pass filtered signal to produce a second low pass filtered signal. A second digitizer 31 is connected to the second low pass filter 30 for digitizing the second low pass filtered signal to produce a second digital signal. An interrupt control unit 20 is connected to the second digitizer 31 for producing the output signal when the control signal is not received.

Operation of the circuit of FIG. 2 will now be described. The LED 11, the LED driver 13, the optical sensor 14, the first amplifier 15, the high pass filter 16, and the second amplifier 17 are operable in the manner described in connection with FIG. 1.

The first low pass filter 28 filters the second amplified signal to produce the first low pass filtered signal. For example, the first low pass filter 28 removes a high frequency noise having a pulse width narrower than 1/19.2 kbps, namely, shorter than 52 microseconds.

The first digitizer 29 converts the first low pass filtered signal to the first digital signal. The serial communication unit 21 has a data terminal RxDATA. The first digital signal is supplied to the data terminal RxDATA.

The second low pass filter 30 filters the first low pass filtered signal to produce the second low pass filtered signal. The second low pass filter 30 removes the high frequency noise having a pulse width shorter than 237 microseconds as before. The second digitizer 31 digitizes the second low pass filtered signal to produce the second digital signal. The interrupt control unit 20 has an interrupt terminal INT and a negative interrupt terminal $\overline{\text{INT}}$. The second digital signal is supplied to the interrupt terminal INT and a negative interrupt terminal $\overline{\text{INT}}$.

When the circuit operates as the serial communication receiver, the serial communication unit 21 converts the first digital signal to the output signal to give a predetermined form to the output signal. The predetermined form is similar to that described in conjunction with FIG. 1. The output signal is supplied to the processor 22. While the circuit operates as the serial communication receiver, the processor 22 supplies the control signal to the interrupt control unit 20 to mask both the interrupt terminal INT and the negative interrupt terminal $\overline{\text{INT}}$.

When the circuit operates as the bar code reader, the interrupt control unit 20 detects trailing edges and leading edges from the second digital signal to produce the output signal having a predetermined pattern. The predetermined pattern is similar to that described in connection with FIG. 1. While the circuit operates as the bar code reader, the processor 22 supplies the control signal to the serial communication unit 21 to mask the data terminal RxDATA.

Figure 3:
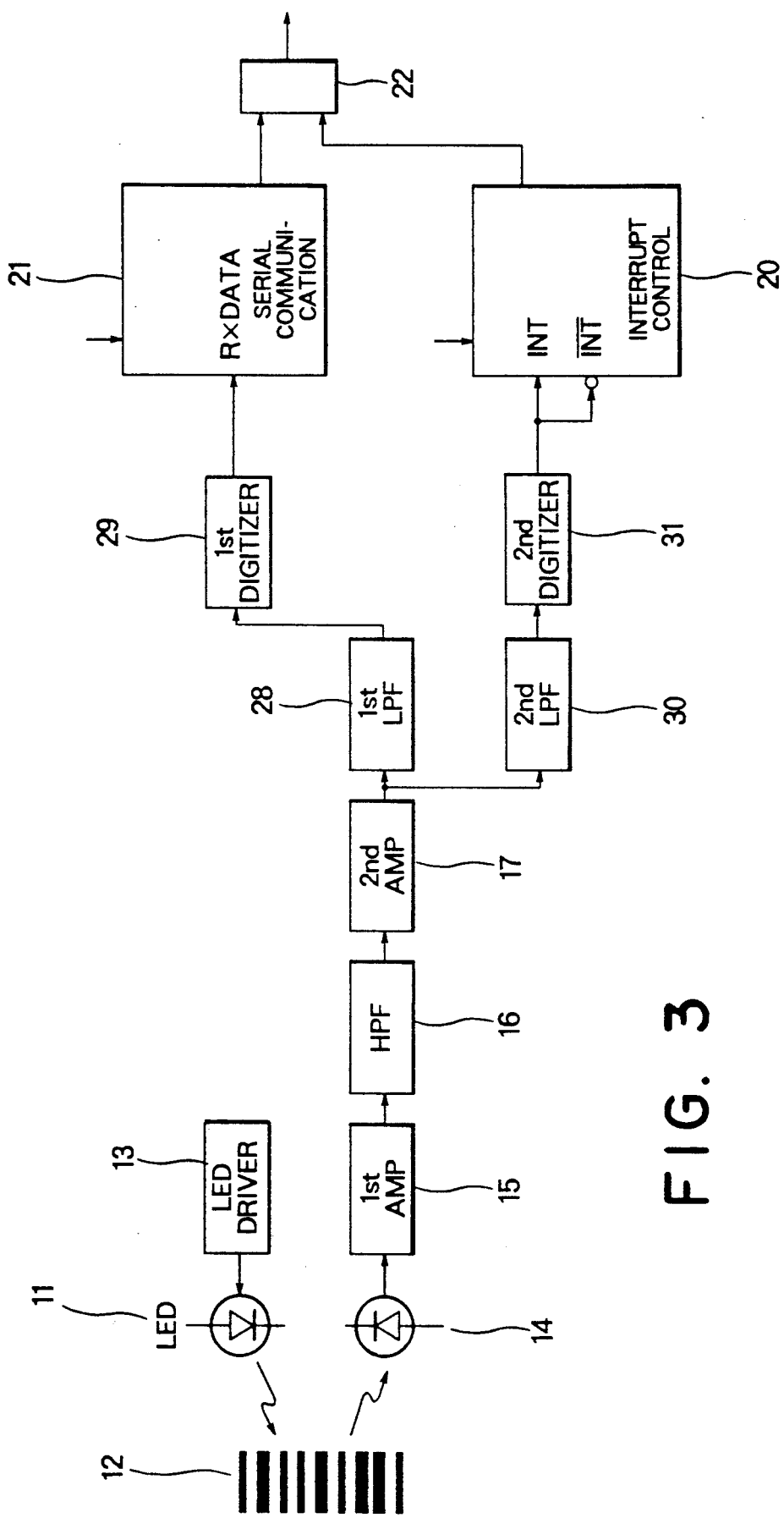
FIG. 3 is a block diagram of a circuit comprising a bar code reader and an optical communication receiver according to another embodiment of this invention.

Referring to FIG. 3, the description will proceed to a different circuit according to a second embodiment of this invention. Similar parts are designated by like reference numerals.

In the manner described with reference to FIGS. 1 and 2, this circuit is for use in combination with a processor for producing a control signal. The circuit comprises a bar code reader and an optical communication receiver and is selectively operable as the bar code reader and the optical communication receiver. The bar code reader reads a bar code responsive to code illuminating light for producing reflected light. The optical communication receiver receives an optical signal. The bar code reader and the optical communication receiver are selectively controlled by the control signal to produce an output signal.

In FIG. 3, the bar code reader comprises a LED 11 for illuminating a bar code 12, which produces the reflected light. A LED driver 13 is connected to the LED 11 for driving the LED 11. The bar code reader and the optical communication receiver comprise in common an optical sensor 14 for converting a combination of the reflected light and the optical signal to an electric signal. A first amplifier (1st AMP) 15 is connected to the optical sensor 14 for amplifying the electric signal to produce a first amplified signal. A high pass filter (HPF) 16 is connected to the first amplifier 15 for filtering the first amplified signal to produce a high pass filtered signal. A second amplifier (2nd AMP) 17 is connected to the high pass filter 16 for amplifying the high pass filtered signal to produce a second amplified signal.

The optical communication receiver comprises a first low pass filter (1st LPF) 28 connected to the second amplifier 17 and has a first cutoff frequency to filter the second amplifier signal into a first low pass filtered signal. A digitizer 29 is connected to the first low pass filter 28 for digitizing the first low pass filtered signal to produce a first digital signal. A serial communication unit 21 is connected to the first digitizer 29 for converting the first digital signal to the output signal to give a predetermined form to the output signal when the control signal is not received. The predetermined form will shortly be described. The bar code reader comprises a second low pass filter (2nd LPF) 30 having a second cutoff frequency and connected to the second amplifier 17 rather than connected to the first low pass filter 28. The second low pass filter 30 is for filtering the second amplified signal to produce a second low pass filtered signal. A second digitizer 31 is connected to the second low pass filter 30 for digitizing the second low pass filtered signal to produce a second digital signal. An interrupt control unit 20 is connected to the second digitizer 31 for producing the output signal when the control signal is not received.

Operation of the circuit of FIG. 3 will now be described. The LED 11, the LED driver 13, the optical sensor 14, the first amplifier 15, the high pass filter 16, and the second amplifier 17 are operable in the manner described in connection with FIGS. 1 and 2.

The first low pass filter 28 filters the second amplified signal to produce the first low pass filtered signal. The first low pass filter 28 removes a high frequency noise having a pulse width narrower than, for example, 52 microseconds.

The first digitizer 29 converts the first low pass filtered signal to the first digital signal. The second low pass filter 30 filters the second amplified signal to produce the second low pass filtered signal. The second low pass filter 30 removes the high frequency noise having a pulse width shorter than 237 microseconds as before. The second digitizer 31 digitizes the second low pass filtered signal to produce the second digital signal.

When the circuit operates as the serial communication receiver, the serial communication unit 21 converts the first digital signal to the output signal to give a predetermined form to the output signal. The predetermined form is similar to that described in conjunction with FIGS. 1 and 2. The output signal is supplied to the processor 22. While the circuit operates as the serial communication receiver, the processor 22 supplies the control signal to the interrupt control unit 20 to mask both the interrupt terminal INT and the negative interrupt terminal $\overline{INT}$.

When the circuit operates as the bar code reader, the interrupt control unit 20 detects trailing edges and leading edges from the second digital signal to produce the output signal having a predetermined pattern. The predetermined pattern is similar to that described in connection with FIGS. 1 and 2. While the circuit operates as the bar code reader, the processor 22 supplies the control signal to the serial communication unit 21. The control signal makes the serial communication unit 21 mask a data terminal RxDATA.

In the first and the second embodiments, the control signal masks either the interrupt terminal INT and the negative interrupt terminal $\overline{INT}$ or the data terminal RxDATA. The control signal may allow either the interrupt control unit or the serial communication unit to produce the output signal.

What is claimed is:

1. A circuit for use in combination with a processor for producing a control signal, said circuit comprising a bar code reader for reading a bar code responsive to code illuminating light for producing reflected light and an optical communication receiver for receiving an optical signal and selectively controlled by said control signal to produce an output signal, said bar code reader and said optical communication receiver including common photoelectric means for converting a combination of said reflected light and said optical signal to an electric signal, wherein:

said bar code reader and said optical communication receiver comprises in common a first low pass filter having a first cutoff frequency and connected to said photoelectric means for filtering said electric signal to produce a first low pass filtered signal;

said optical communication receiver comprising:

a first digitizer connected to said first low pass filter for digitizing said first low pass filtered signal to produce a first digital signal; and a serial communication unit connected to said first digitizer for converting said first digital signal to said output signal to give a predetermined form to said output signal when said control signal is not received;

said bar code reader comprising:

a second low pass filter having a second cutoff frequency and connected to said first low pass filter for filtering said first low pass filtered signal to produce a second low pass filtered signal;

a second digitizer connected to said second low pass filter for digitizing said second low pass filtered signal to produce a second digital signal; and an interrupt control unit connected to second digitizer for producing said output signal when said control signal is not received.

2. A circuit as claimed in claim 1, wherein:

said serial communication unit converts said first digital signal to said output signal to give said predetermined form to said output signal also when said control signal is received;

said interrupt control unit producing said output signal also when said control signal is received.

3. A circuit as claimed in claim 1, wherein:

said first cutoff frequency is higher than said second cutoff frequency.

4. A circuit for use in combination with a processor for producing a control signal, said circuit comprising a bar code reader for reading a bar code responsive to code illuminating light for producing reflected light and an optical communication receiver for receiving an optical signal and selectively controlled by said control signal to produce an output signal, said bar code reader and said optical communication receiver including common photoelectric means for converting a combination of said reflecting light and said optical signal to an electric signal, wherein:

said optical communication receiver comprises:

a first low pass filter having a first cutoff frequency and connected to said photoelectric means for filtering said electric signal to produce a first low pass filtered signal;

a first digitizer connected to said first low pass filter for digitizing said first low pass filtered signal to produce a first digital signal; and a serial communication unit connected to said first digitizer for converting said first digital signal to said output signal to give a predetermined form to said output signal when said control signal is not received;

said bar code reader comprising:

a second low pass filter having a second cutoff frequency and connected to said first low pass filter for filtering said first low pass filtered signal to produce a second low pass filtered signal;

a second digitizer connected to said second low pass filter for digitizing said second low pass filtered signal to produce a second digital signal; and an interrupt control unit connected to said second digitizer for producing said output signal when said control signal is not received.

5. A circuit as claimed in claim 4, wherein:

said serial communication unit converts said first digital signal to said output signal to give said predetermined form to said output signal also when said control signal is received;

said interrupt control unit producing said output signal also when said control signal is received.

6. A circuit as claimed in claim 4, wherein:

said first cutoff frequency is higher than said second cutoff frequency.

* * * * *